(12) United States Patent
Diesch et al.

(10) Patent No.: US 7,839,877 B2
(45) Date of Patent: Nov. 23, 2010

(54) METHOD FOR OPERATING AN AUTOMATION DEVICE AND AUTOMATION DEVICE

(75) Inventors: Wilhelm Diesch, Otterfing (DE); Dieter Klotz, Fürth (DE); Patrik Sieberling, Seukendorf (DE); Wolfgang Werner, Schmidgaden (DE)

(73) Assignee: Siemens Aktiengesellschaft, Munich (DE)

( * ) Notice: Subject to any disclaimer, the term of this patent is extended or adjusted under 35 U.S.C. 154(b) by 449 days.

(21) Appl. No.: 11/811,943

(22) Filed: Jun. 12, 2007

(65) Prior Publication Data
US 2007/0286242 A1    Dec. 13, 2007

(30) Foreign Application Priority Data
Jun. 12, 2006 (EP) .................................. 06012055

(51) Int. Cl.
*H04L 12/28* (2006.01)

(52) U.S. Cl. ..................................... 370/412
(58) Field of Classification Search ........................ None
See application file for complete search history.

(56) References Cited

U.S. PATENT DOCUMENTS

| | | | |
|---|---|---|---|
| 2002/0055999 A1* | 5/2002 | Takeda | 709/224 |
| 2002/0112054 A1* | 8/2002 | Hatanaka | 709/225 |
| 2005/0135433 A1* | 6/2005 | Chang et al. | 370/536 |
| 2005/0207380 A1* | 9/2005 | Blasco Claret et al. | 370/338 |
| 2005/0246186 A1* | 11/2005 | Nikolov | 705/1 |
| 2006/0062228 A1* | 3/2006 | Ota et al. | 370/401 |
| 2006/0075044 A1* | 4/2006 | Fox et al. | 709/206 |
| 2006/0120405 A1* | 6/2006 | Engbersen | 370/473 |
| 2006/0271823 A1* | 11/2006 | Smith | 714/37 |
| 2006/0282446 A1* | 12/2006 | Suzuki et al. | 707/100 |
| 2007/0088793 A1* | 4/2007 | Landsman | 709/207 |

FOREIGN PATENT DOCUMENTS

| | | |
|---|---|---|
| DE | 101 41 187 A1 | 9/2002 |
| EP | 0 990 964 A1 | 4/2000 |
| EP | 1 594 063 A1 | 11/2005 |

* cited by examiner

*Primary Examiner*—Hong Cho
*Assistant Examiner*—Ajay P Cattungal

(57) ABSTRACT

A method is specified for the operation of an automation device provided for the receiving of telegrams together with such an automation device, which is distinguished by the fact that the automation device manages a resource pool for telegrams which are arriving or received, that the automation device distinguishes between active and new communication relationships with a remote communication participant and that for each new communication relationship a free resource is selected from the resource pool and thereafter is used for this communication relationship, which thereby becomes an active communication relationship.

17 Claims, 2 Drawing Sheets

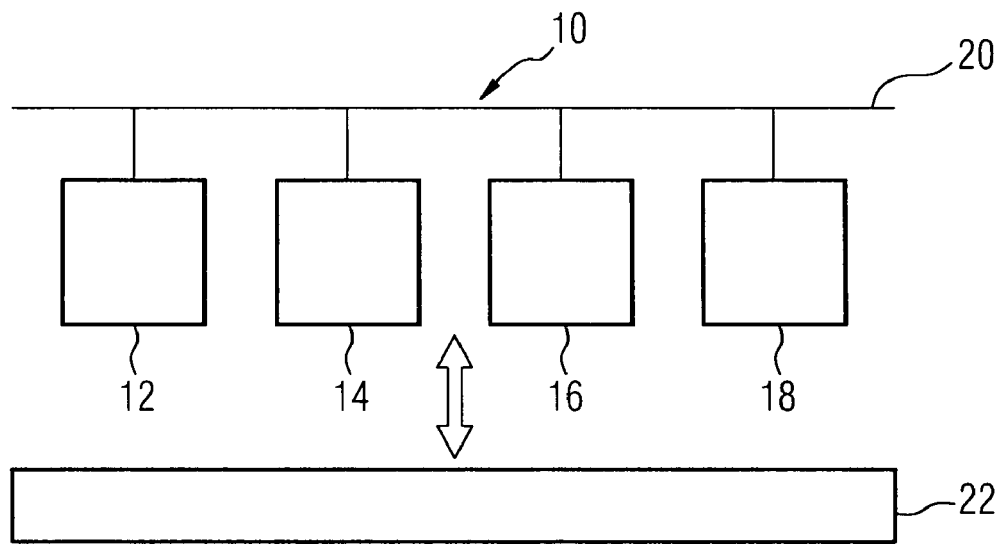
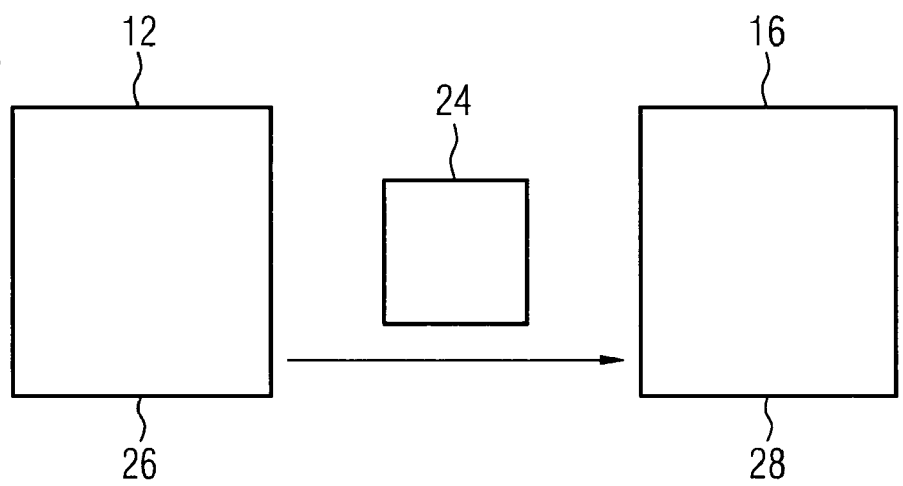

METHOD FOR OPERATING AN AUTOMATION DEVICE AND AUTOMATION DEVICE

CROSS REFERENCE TO RELATED APPLICATIONS

This application claims priority of European application No. 06012055.7 EP filed Jun. 12, 2006, which is incorporated by reference herein in its entirety.

FIELD OF INVENTION

The present invention relates to a method for operating an automation device provided for the receipt of telegrams, together with an automation device which works in accordance with the method or for the purpose of executing the method.

BACKGROUND OF THE INVENTION

Methods of this generic type and appropriate automation devices are known per se. Thus, for example, the applicant for the present invention supplies automation devices, under the brand name SIMATIC, which can be joined by communication links in a communication network and which in operation exchange data, i.e. communicate, in accordance with a standardized layout (protocol). Here the protocol concerned is prescribed, or can be prescribed, for the relevant communication medium and/or the topology of the communication network and/or the application concerned.

For communication between automation devices, of the same type or different, in a communication network made up of automation devices which are networked with each other for communication a distinction is made between different communication relationships. A possible communication relationship is that between a first automation device or communication participant (the transmitter) and another communication participant or automation device (the receiver), for which the data items intended for transfer by the transmitter are defined. In just the same way, a communication relationship can exist between one transmitter and a plurality of receivers. In particular in the case of a communication relationship between one transmitter and a plurality of receivers, which is normally handled using so-called broadcast or multicast telegrams, there is then a problem in the processing of the data arriving at the receiver concerned if the quantity of the data is such that it cannot be communicated within one telegram. If the data set to be transmitted cannot be transmitted in a single telegram, the data set is split up in accordance with the relevant data transmission protocol into several successive telegrams. The data to be transmitted is thus fragmented. If, during a sequence of telegrams which are arriving at the receiver concerned in connection with a communication relationship, telegrams which belong to other communication relationships also arrive this has until now required demanding management and assignment of the data which is arriving.

SUMMARY OF INVENTION

Starting from this disadvantage in the prior art, an object of the invention consists in specifying a simple method, and a corresponding facility, with which it is possible at any time to make a unique assignment of data which is arriving, in particular to a specific transmitter and/or a specific communication relationship.

This object is achieved by a method with the features of an independent claim. To this end, for the operation of an automation device which is intended and suitable for the receipt of telegrams, provision is made in accordance with the invention for the automation device to distinguish between active and new communication relationships, for each new communication relationship a particular resource is selected—insofar as it is available—and this is used thereafter, in particular is used exclusively, for this communication relationship which thus becomes an active communication relationship. For this purpose a storage area, which acts as a resource pool for arriving or received telegrams, and which includes at least one storage segment which has at least one storage block, is assigned to the automation device. In this connection, the term assigned means that the storage area is provided or is made available in local storage incorporated in the automation device or in remote storage with has a communication link with the automation device. The automation device distinguishes between active and new communication relationships with a remote communication participant, i.e. the transmitter concerned. In the communication relationship, the automation device itself acts as the receiver, and for each new communication relationship, i.e. any communication relationship which is not yet active and thus ultimately not yet "known", selects, from the resource pool a free resource, i.e. a storage segment and/or a storage block. With the selection of such a free resource, which is subsequently used for this communication relationship, the communication relationship concerned becomes an active communication relationship. The communication relationship is managed thereafter using exclusively the selected resource.

The use of a free resource, i.e. a selected storage segment or a selected storage block, for an active communication relationship will preferably be ensured by reference to a transmitter identifier which identifies the remote communication participant. To this end the transmitter identifier is guaranteed by means of suitable precautions, in particular on the basis of appropriate configuration settings, to be unique within the communication network concerned.

If the transmitter identifier includes an address which identifies the remote communication participant, the transmitter concerned, together with an ordering criterion inserted into the telegram concerned by the transmitter concerned, it is possible to distinguish communication relationships not only in respect of the remote communication participants. Basically, the way that communication relationships are distinguished by reference to the transmitter identifier concerned is that the latter refers to the transmitter concerned, i.e. the automation device which put the telegram concerned onto the bus. In a preferred embodiment, the transmitter identifier includes an address which identifies the transmitter or a reference which in this respect is comparably unique, together with an ordering criterion. Such an address is uniquely prescribed for each communication participant, e.g. by an appropriate configuration setting. For the ordering criterion, consideration can basically be given to any item of data which can be distinguished from other items of data, e.g. a number from the set of natural numbers. An ordering criterion is defined for a transmitter or for an application running on the transmitter, e.g. by an appropriate configuration setting. This makes it possible to distinguish on the one hand the communication participant concerned, together with an application running on it, or any other functional unit to which the ordering criterion relates, as the origin of a new or an existing communication relationship. In this way it is also possible to distinguish communication relationships between a first automation device, acting as the transmitter, and a second automation device acting as the receiver even when several software applications at the transmitter end are transmitting telegrams to the receiver. If the ordering criterion were not used, only address data or suchlike would be available as the transmitter and/or receiver identifier for the analysis of the telegram and for the selection of free resources. However in this case, if the participating devices are the same, i.e. for example two software applications which are transmitting from the same automation device acting as the transmitter, the transmitter identifier would then also be the same. In addition, the telegrams in the chosen example would also be determined to be for the same receiver. Hence the use of a transmitter identifier (and/or receiver identifier) made up only by reference to address data does not enable the communication relationship concerned to be unambiguously distinguished. By the additional inclusion, when the transmitter identifier is formed, of the ordering criterion, which is or can be specified uniquely for each application e.g. by a suitable configuration setting, it remains possible to distinguish communication relationships even when they originate from the same automation device acting as the transmitter.

It is preferable in addition if provision is made that, when a telegram arrives, the automation device checks the transmitter identifier concerned by reference to permitted transmitter identifiers. For this purpose, a number of permitted transmitter identifiers is or can be stored in storage assigned, in the sense already mentioned above, to the automation device. The permitted transmitter identifier, or each one, is here determined in particular by appropriate configuration settings, for example if a communication relationship between a particular application of a particular first automation device and a particular application of a particular second automation device is provided for and, in this connection at the latest, a transmitter identifier is defined, that is in particular the combination of address and ordering criterion. If such a check fails, this indicates that the telegram concerned is not intended for the receiver at which it has arrived. It is thereupon possible, with almost no delay, to dispatch to the transmitter a message about this. Without such a check, recognizing telegrams which are not intended for a particular receiver but which have arrived there is only possible after the contents of the telegram have been analyzed. The time delay, between a message to the transmitter which may then be necessary and the original telegram dispatch, is out of all proportion to the time delay which arises between the telegram dispatch and message if a check is carried out immediately upon receipt of a telegram, that its transmitter identifier is compatible with permitted transmitter identifiers.

According to a further aspect of the invention, provision is made that a resource, i.e. a storage segment and/or a storage block, is only selected if the transmitter identifier concerned corresponds to a permitted transmitter identifier. This ensures, for example, that data contained in the telegram which is received only occupies storage space at the receiver end if the data concerned is actually intended for the receiver concerned.

The checking of the transmitter identifier will preferably be effected by reference to a permitted transmitter identifier by checking of the address and ordering criterion pairs. A telegram or an underlying communication relationship will then only be recognized as permitted if both the address and also the ordering criterion agree with corresponding entries in the permitted transmitter identifier. A simple implementation of such pairwise checking is possible if the address and ordering criterion are combined into one data item, both in the case of the transmitter identifier and also in the case of each permitted transmitter identifier which is to be checked.

If, for each permitted transmitter identifier or by reference to each permitted transmitter identifier as applicable, it is possible to assign or select for the telegram which is received a resource, that is a storage segment and/or a storage block, the relevant resource used or provided for use is prescribed by the receiver, where the assignment may be alterable and a selection may be made at the time when the method is run, considering the availability of resources.

In accordance with a further aspect of the invention, provision is made that the ordering criterion for a permitted transmitter identifier determines a relevant storage segment, and that a storage block within this storage segment is selected and used. Alternatively, it also possible to provide that the address of a permitted transmitter identifier determines a relevant storage segment and that a storage block within this storage segment is selected and used. In the case of both alternatives, a storage segment is selected by reference to a criterion which characterizes the origin of the telegram. The storage segment is then available exclusively for telegrams which have in their transmitter identifier the relevant address or the relevant ordering criterion. Within the storage segment a storage block is then selected, as the actual storage site for a telegram which is received, or for the data contained in the telegram, according to the availability of such storage blocks. After such a selection is made, the storage block which has been selected is logged for the automation device. The same storage segment is then selected for subsequent communication relationships under the same transmitter identifier. On the basis of the logging of the resources used in this known communication relationship, that is at the lowest level on the basis of the logging of the storage block concerned, they or it will be used for each further communication in this communication relationship. Preferably, for each of these storage blocks details will be administered of the place where an entry may be made for new data without this overwriting old data which has not yet been analyzed.

When data is received in the form of telegrams as part of an active communication relationship, the data contained in the incoming telegrams concerned will, by reference to the resource assigned to this communication relationship, always be stored away exclusively in the relevant storage block. If, while telegrams are being received for this communication relationship, telegrams for other communication relationships arrive at the automation device concerned, no conflicts can arise because the data items received in the telegrams for such other communication relationships are assigned to other resources, i.e. other storage blocks and if appropriate other storage segments, and will therefore be stored with no danger or with just a slight possibility of a collision with data from other communication relationships.

Preferably, a selected resource will be released again when a data transfer within the communication relationship concerned is completed. In this way it will be ensured that selected resources become available again for other communication relationships when the data communicated in a completed communication relationship has been received and/or analyzed.

It is further preferable if provision is made that an error message is communicated to a, or to the, remote communication participant, i.e. to the transmitter, if no free resource is available at the receiver for a new communication relationship. The remote communication participant concerned, to which such an error message goes, must then defer its transmission wish, that is the communication of the telegram concerned, until such time as one of the resources which is currently in use at the receiver becomes free again, after a communication relationship which is being handled by it has terminated.

The method in accordance with the invention can be implemented as software, firmware and/or hardware. Correspondingly, the invention relates to a computer program with program code instructions, which can be executed by a computer, for the purpose of implementing the method described above when the computer program is executed on a computer, and a computer program product, in particular a storage medium, with a computer program of this type which can be executed by a computer.

Likewise, the invention relates to an automation device with program code facilities, in particular an implementation of the method described above in software and/or hardware, where a resource pool is assigned to the automation device, where incoming telegrams can be distinguished as belonging to an active or to a new communication relationship with a remote communication participant, and where a free resource can be selected from the resource pool for each new communication relationship and can thereafter be used for this communication relationship, which thereby becomes an active communication relationship. In a particularly preferred embodiment of such an automation device, the automation device is provided with a processing unit, i.e. for example a so-called application-specific integrated circuit (ASIC) or the like, e.g. FPGA etc.

The claims submitted with the application are formulation proposals, without prejudice to the achievement of wider patent protection. The applicant reserves the right to claim further combinations of features, so far only disclosed in the description and/or the drawing.

The, or any, exemplary embodiment is not to be considered as a restriction on the invention. Rather, in the context of the present disclosure, there are numerous possible alterations and modifications, in particular such variants, elements and combinations as a person skilled in the art could derive in respect of the solution of the problem, for example by the combination or adaptation of individual features or elements or method steps described in connection with the general or special descriptive section and contained in the claims and/or the drawing and which, by features which can be combined, lead to a new object or to new method steps or sequences of method steps.

References back used in subclaims refer to the further development of the subject matter of the main claim by the features of the subclaim concerned; they are not to be understood as a waiver with regard to achieving independent item protection for the combination of features in the related subclaims. Furthermore, the assumption should be made in each case, in respect of the interpretation of the claims when a feature is put into more precise concrete terms in a subordinate claim, that a restriction of this type is not present in the relevant preceding claims.

Since the subjects of the subclaims can, in respect of the prior art as at the priority date, form separate and independent inventions, the applicant reserves the right to make them the subject of independent claims or declarations of subdivision. They can, furthermore, also contain independent inventions which have a form independent of the subjects of the preceding subclaims.

BRIEF DESCRIPTION OF THE DRAWINGS

An exemplary embodiment of the invention is explained in more detail below by reference to the drawing. Objects or elements which correspond to each other have the same reference numbers in all the figures.

The figures show

FIG. 1 a simplified schematic diagram of an automation system,

FIG. 2 a simplified schematic diagram of a data exchange between two automation devices, and FIG. 3 an automation device structured in accordance with the invention.

DETAILED DESCRIPTION OF INVENTION

Figure 3:
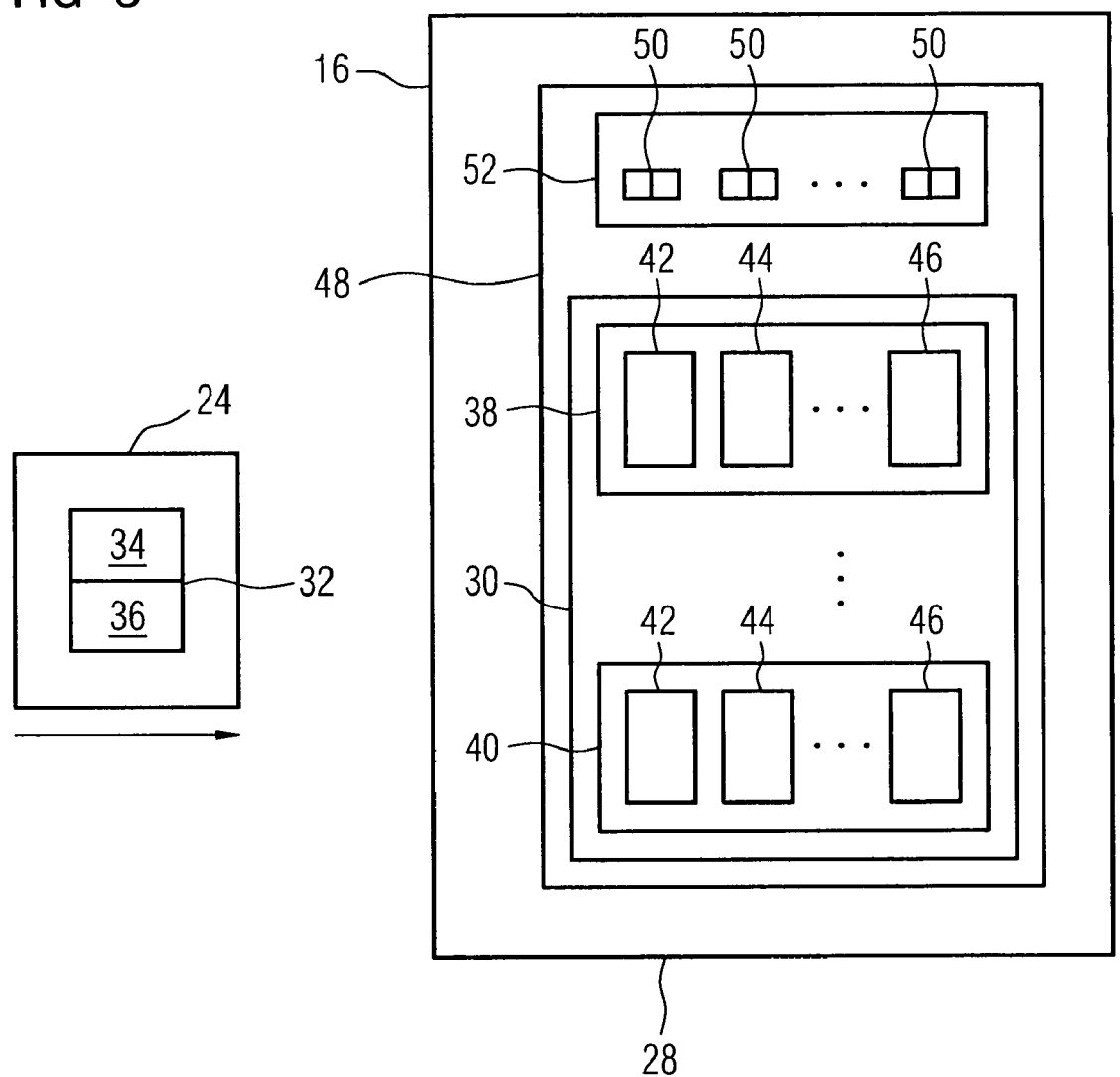

FIG. 1 shows a simplified schematic diagram of an automation system 10 with a number of communication participants 12, 14, 16, 18 which are joined by communication links. Here, the communication link between the individual communication participants 12 to 18 are effected on the basis of a bus 20, in particular a field bus, e.g. the so-called PROFIBUS. As shown in the illustration chosen as an example, the automation system 10 with its automation devices 12 to 18 is provided in a manner known per se for the purpose of controlling and/or monitoring a technical process 22, which is not shown in more detail.

FIG. 2 shows, again in a simplified schematic way, a data exchange between two automation devices 12 to 18 of the automation system 10 (FIG. 1), i.e. for example a first automation device 12 and a second automation device 16. Here, the data exchange is effected over the bus 20 (FIG. 1), and is handled in accordance with a protocol prescribed for the bus 20, by the communication of telegrams 24 between the first automation device 12, which in the situation illustrated is acting as the transmitter 26, and the second automation device 16 which is acting as the receiver 28.

If the data to be communicated from the transmitter 26 to the receiver 28 is of such a volume that it cannot be accommodated within a single telegram 24, which in accordance with the relevant protocol has a fixed prescribed size, the communication of the data is effected by a plurality of successive telegram 24. If a series of telegrams 24 belonging to different data transmission operations/communication relationships arrive at a receiver 28 simultaneously or quasi-simultaneously from several transmitters 26 or from the same transmitter 26, this makes a unique assignment of the individual telegrams 24 to the relevant communication relationship more difficult.

For the avoidance or at least reduction of this disadvantage, provision is made in accordance with the invention for a storage area 30, which acts as a resource pool, to be assigned to each automation device 12 to 18 (FIG. 1). This is shown in FIG. 3 by reference to the automation device/communication participant 16 which is acting as the receiver 28. A telegram 24 which arrives at the receiver 28 or is received by the receiver 28 can here be distinguished by the receiver 28 as belonging to an active or to a new communication relationship with a remote communication participant 12, i.e. to the relevant transmitter 26 (FIG. 2).

This distinction is made at least by reference to a transmitter identifier 32 included in the telegram 24, which references the relevant transmitter 26, i.e. the automation device 12 to 18, which put the telegram 24 concerned on the bus 20. In a preferred embodiment, the transmitter identifier 32 includes an address 34 which identifies the transmitter 26, or a reference which in this respect is comparably unique, together with an ordering criterion 36.

Such an address 34 is prescribed uniquely for each communication participant, e.g. by an appropriate configuration setting. For the ordering criterion 36, consideration can basically be given to any data item which can be distinguished from other data, e.g. a number from the set of natural numbers. An ordering criterion 36 is defined for a transmitter 26 or for an application running on the transmitter 26, e.g. by an appropriate configuration setting.

If a receiver 28 has not so far received any telegrams 24 under a particular transmitter identifier 32 then, at least when a first telegram 24 with this transmitter identifier 32 is received, a new communication relationship comes into being. Thus a new communication relationship also comes into being, for example, if telegrams 24 had already been received from a transmitter 26 under a first ordering criterion 36 and then instead a telegram 24 arrives with an ordering criterion 36 not previously used by this transmitter 26. It is then possible to distinguish the origin of the telegram 24 not merely as the transmitter 26 concerned, i.e. for example the relevant automation device 12 to 18, but for example also as an application or the like running on the relevant automation device 12 to 18.

As soon as at least one telegram 24 with a particular transmitter identifier 32 has been received from a transmitter 26, subsequent telegrams 24 received from this transmitter 26 will be regarded as belonging to the active communication relationship which was started by the first telegram 24 with this transmitter identifier 32.

If a new communication relationship, that is a telegram 24 which has a transmitter identifier 32 for which there is currently no active communication relationship, is recognized, a free resource e.g. a first, second etc. storage segment 38, 40 together with a first, second, third etc. storage block 42, 44, 46 in the relevant storage segment 38, 40 is selected from the storage area 30 which is acting as a resource pool for this new communication relationship. The resource concerned is then used exclusively for the new communication relationship, which becomes an active communication relationship at the latest when it is assigned to a previously free resource.

In the diagram in FIG. 3, the storage area 30 which acts as the resource pool is shown as a block in a storage 48 assigned to the receiver 28. The storage area 30 need not necessarily be in the local storage 48 of the receiver 28. The storage area 30 can equally well be provided in storage, not shown, which can only be reached via the bus 20 (FIG. 1).

The selection of a free resource, i.e. a storage segment 38, 40 and a storage block 42 to 46, is made in conjunction with the recognition of a new communication relationship by reference to permitted transmitter identifiers 50 assigned to the receiver 28 which, as shown in the diagram in FIG. 3, are kept available in a database 52 of permitted transmitter identifiers 50 stored in the storage 48, where this database 52 can also be stored in any other storage which the receiver 28 is able to reach. The, or any, permitted transmitter identifier 52 is assigned to a relevant receiver 28, e.g. during the configuration setting for an automation device. In the course of such configuration setting, the communication relationships which are necessary, between the individual communication participants and/or the applications running on them, are defined. It is thereby also possible to assign the transmitter identifiers 32 to be used on the part of each transmitter 26 (FIG. 2), and correspondingly the permitted transmitter identifiers 50 for the automation devices 12 to 18 (FIG. 1), i.e. the receiver 28 concerned, for which the telegrams 24, which are sent later because of the communication relationship, are intended. On receipt of a telegram 24, the receiver 28 concerned checks the transmitter identifier 32 contained in the telegram 24 by reference to the or any permitted transmitter identifier 50 which is assigned to it. If no matching permitted transmitter identifier 50 is found for the transmitter identifier 32 received, the telegram 24 is rejected and, preferably, the transmitter 26 concerned (FIG. 2) is informed of this in a message, e.g. an error message (not shown). On the other hand, if a permitted transmitter identifier 50 is found which matches the transmitter identifier 32 which was received, this indicates that the telegram 24 which was received is intended for the receiver 28 concerned. Thereupon, using the transmitter identifier 32 (or, for example if the transmitter identifier 32 and the permitted transmitter identifier 50 are not identical, using the permitted transmitter identifier 50) a free resource is selected, from the storage area 30 which is acting as the resource pool, in which to save the telegram 24 or at least the data contained in the telegram 24. In doing this the ordering criterion 36 in the transmitter identifier 32 (or in the permitted transmitter identifier 50) will, according to a preferred embodiment, reference the relevant storage segment 38, 40. By this means, a storage site for data which has been communicated is determined, at least approximately, even during configuration setting, during which the ordering criterion 36 is defined. In the storage segment 38, 40 concerned, a storage block 42 to 46 which is free, i.e. is not currently being used by another communication relationship with the same ordering criterion 34, is selected as the free resource and is used for the new communication relationship and for further communications under this communication relationship.

Data items which belong to the same active communication relationship and which arrive at the receiver 28 in successive telegrams 24 are stored temporarily in the storage segment/block 38, 40, 42 to 46 associated with the relevant selected resource. If, during the receipt of successive telegrams 24 for a first active communication relationship, telegrams 24 for another active communication relationship or a new communication relationship arrive at the same receiver 28, the data items which are contained in the telegrams 24 for other active communication relationships are assigned to the resources in the resource pool which are exclusively assigned to these active communication relationships or, for a new communication relationship, a free resource is selected and the data items are then assigned to this resource, so that collisions are in each case avoided, at least if free resources are still available in the resource pool.

Only if no free resources are available in the resource pool when a new communication relationship is recognized does the automation device concerned, 14 to 18, which is acting as the receiver 28 transmit a message about this, i.e. for example an error message, to the transmitter 26 from which the telegram which would initiate such a new communication relationship originates, so that the transmitter 26 concerned defers the communication of the or any telegram 24 which is to be communicated as part of the communication relationship which cannot currently be processed, and repeats it at a later point in time. Such a repetition will continue until a resource becomes free at the receiver 28, and the communication relationship can be handled appropriately.

Hence: a method is specified for the operation of an automation device 12, 14, 16, 18 provided for the purpose of receiving telegrams 24, together with such an automation device 12 to 18, which is distinguished by the fact that the automation device 12 to 18 manages a resource pool for arriving or received telegrams 24, that the automation device 12 to 18 distinguishes between active and new communication relationships with a remote communication participant 12 to 18 and that for each new communication relationship a free resource is selected from the resource pool and is thereafter used for this communication relationship, which thereby becomes an active communication relationship.

The invention claimed is:

1. A method for operating an automation device providing a receipt of telegrams, comprising:

providing an automation system configured to control or monitor a technical process and comprising a plurality of automation devices capable of exchanging data telegrams between one another, wherein communication from a transmitter one of the automation devices to a receiver one of the automation devices is in accord with a fixed data limit size for an individual data telegram, and wherein, for a data communication from the transmitter to the receiver, multiple telegrams must be transmitted from the transmitter to the receiver when the volume of the data communication exceeds the fixed data limit size;

providing a first active communication relationship between a first transmitting automation device and a first receiving automation device wherein for one data communication to the receiving automation device the volume of the data communication exceeds the fixed data limit size;

providing a second active communication relationship with the first receiving automation device;

distinguishing between the first active communication relationship and the second active communication relationship by including in at least the one data communication of the first active communication relationship at least a reference to an identifier for the first transmitting automation device;

providing a storage area and selecting a first storage segment from the storage area for the one data communication of the first active communication relationship and selecting a second storage segment as a database comprising the identifier and one or more other identifiers each identifying the active communication relationships; and using the first storage segment for storing a volume of data corresponding to all of the data in the one data communication of the first active communication which volume exceeds the fixed data limit size of an individual data telegram.

2. The method as claimed in claim 1, wherein, in the second active communication relationship with the first receiving automation device, one data communication to the first receiving automation device includes a volume of data communication which also exceeds the fixed data limit size of an individual telegram; and wherein for the second active communication relationship a second storage segment different from the first storage segment is selected from the storage area for storing the volume of data communication associated with the one data communication of the second active communication relationship.

3. The method as claimed in claim 1, wherein the step of distinguishing between the first active communication relationship and the second active communication relationship further includes in at least the one data communication of the first active communication relationship an ordering criterion, and the reference to an identifier for the first transmitting automation device includes address information of the first transmitting automation device.

4. The method as claimed in claim 1, wherein use of a second storage segment for the one communication of the second active communication relationship is ensured by reference to a transmitter identifier which identifies a transmitting communication participant in the second active communication.

5. The method as claimed in claim 4, wherein the transmitter identifier has:

an address to identify the remote communication participant and an ordering criterion inserted into the telegram, wherein the ordering criterion is inserted by the remote communication participant, and wherein the communication participant in the second active communication is the first transmitting automation device.

6. The method as claimed in claim 4, wherein the first receiving automation device checks the transmitter identifier of an arriving telegram by reference to permitted transmitter identifiers.

7. The method as claimed in claim 5, wherein the first storage segment is only selected and used for the one data communication of the first active communication relationship if the associated data includes a transmitter identifier which corresponds to a permitted transmitter identifier.

8. The method as claimed in claim 5, wherein the first storage segment is only selected if the data associated with the one data communication of the first active communication relationship includes a transmitter identifier which corresponds to a permitted transmitter identifier.

9. A method for operating an automation device providing a receipt of telegrams, comprising:

including, in each active communication from a remote transmitting participant to the automation device, for each first active communication relationship with the remote transmitting participant, a reference to a transmitter identifier for the transmitting participant so that the automation device is able to distinguish between a first active communication relationship and a new communication relationships with the same remote participant on the basis of the identifier;

selecting a storage segment from a storage area for each new communication relationship; and using the storage segment for the new communication relationship, which thereby becomes a second active communication relationship;

wherein use of a different storage segment for each active communication relationship is ensured by reference to the transmitter identifier which identifies a remote communication participant and distinguishes the active communication relationship;

wherein the transmitter identifier has:

an address to identify the remote communication participant and an ordering criterion inserted into the telegram, wherein the ordering criterion is inserted by the remote communication participant, and wherein a checking of the transmitter identifier is carried out by reference to a permitted transmitter identifier by checking the address and the ordering criterion.

10. The method as claimed in claim 9, wherein a different storage segment or storage block in the storage segment is assigned to each permitted transmitter identifier.

11. The method as claimed in claim 10, wherein the ordering criterion for a permitted transmitter identifier defines a relevant storage segment, and wherein the storage block within the storage segment is selected and used.

12. The method as claimed in claim 1, wherein a selected storage segment is released for use in another active communication relationship when a data transfer for the associated communication relationship concerned is completed.

13. The method as claimed in claim 2, wherein a selected storage block is released for use in another active communication relationship when a data transfer for the associated communication relationship concerned is completed.

14. The method as claimed in claim 1, wherein an error message is communicated to the transmitting communication participant in the second active communication relationship if no free storage segment is available for the second active communication relationship.

15. The method as claimed in claim 2, wherein an error message is communicated to the transmitting communication participant in the second active communication relationship if no free storage block is available for the second active communication relationship.

16. The method as claimed in claim 1, wherein the method is executed on a computer.

17. The method as claimed in claim 1, wherein the method is executed on the automation device.

* * * * *